United States Patent [19]

Smoot

[11] Patent Number: 5,222,694

[45] Date of Patent: Jun. 29, 1993

[54] AIRCRAFT INTERIOR PANEL NOISE DAMPENING SUPPORT BRACKETS

[75] Inventor: Jesse W. Smoot, Tampa, Fla.

[73] Assignee: ATR International, Inc., Clearwater, Fla.

[21] Appl. No.: 924,083

[22] Filed: Aug. 3, 1992

[51] Int. Cl.⁵ .......................... B64C 1/06; B64C 1/14
[52] U.S. Cl. .................................. 244/119; 244/131
[58] Field of Search ................ 244/117 R, 119, 129.1, 244/131, 118.5; 248/635, 575, 578; 160/368.1; 267/153, 293, 141; 52/397, 144

[56] References Cited

U.S. PATENT DOCUMENTS

| | | |
|---|---|---|
| 2,877,970 | 3/1959 | Albertine et al. ................... 244/119 |
| 2,925,050 | 2/1960 | Candlin, Jr. et al. ................ 244/119 |
| 3,167,295 | 1/1965 | Grumblatt .......................... 248/635 |
| 4,056,208 | 9/1977 | Pampei et al. ...................... 244/119 |
| 4,076,195 | 2/1978 | Uhler .................................. 248/575 |
| 4,442,647 | 4/1984 | Olsen ................................. 244/119 |
| 4,479,621 | 10/1984 | Bergholz ............................ 244/119 |
| 4,799,631 | 1/1989 | Humphries et al. ................ 244/119 |
| 5,110,081 | 5/1992 | Lang, Jr. ............................ 267/293 |

Primary Examiner—Galen Barefoot
Attorney, Agent, or Firm—Herbert W. Larson

[57] ABSTRACT

A lower support bracket has an integral back wall, pair of side walls and a bottom plate with a through bore. An elastomeric spacer is mounted axially above and below the bottom plate bore and an adjuster device is axially mounted below the lower elastomeric spacer. The bracket is held in place by a bolt through the bore to an aircraft frame structure. The back wall is attached to an escutcheon plate which is in turn attached to a lower portion of an aircraft interior panel. The upper support bracket has a mounting plate attached to an aircraft fuselage frame structure. A pivoting arm at a first end is spaced from the mounting plate by an elastomeric gasket and at a second end is attached to a panel bracket attached to an upper portion of the interior panel so that the interior panel is spaced apart from the aircraft fuselage frame structure.

6 Claims, 4 Drawing Sheets

AIRCRAFT INTERIOR PANEL NOISE DAMPENING SUPPORT BRACKETS

BACKGROUND OF THE INVENTION

1. Field of the Invention

This invention relates to aircraft interior frame structures. More particularly, it refers to a bottom and top support bracket for retaining aircraft interior panels spaced from an aircraft outer frame and reducing the transfer of noise vibration to the interior of the aircraft.

2. Description of The Prior Art

Various brackets and other devices have been developed for the purpose of supporting aircraft interior panels. The problem of reducing noise in the interior of aircraft makes the design of these brackets important. U.S. Pat. No. 2,877,970 describes an early vibration dampening connection. A brace for vibration dampening is described in U.S. Pat. No. 3,071,217. In the development of fiber reinforced composites used in airplanes described in U.S. Pat. No. 4,310,132, shear ties are used to attach the frame to the skin of the aircraft. U.S. Pat. No. 4,442,647 describes a suspension system for a panel containing an elastic plate isolator supported in the center of a bracket with a selected spring rate to tune the support. U.S. Pat. No. 4,799,631 describes use of elastomeric overhead and deck isolators to support an aircraft interior module.

While the prior art dampening structures including support brackets have been successful in reducing aircraft interior noise, there is still a need to improve noise and vibration transmitted to aircraft interior panels. Improved support brackets are needed to further reduce noise and vibration.

SUMMARY OF THE INVENTION

We have developed an improved overhead and lower panel bracket which adequately support an aircraft interior panel and substantially reduce noise and vibration transmitted to the panel from the aircraft fuselage.

Our noise dampening lower and upper support brackets hold panels in a rigid but adjustable position. The lower bracket has an integral back wall, pair of side walls and a bottom plate containing a central through bore. A pair of elastomeric spacers having through bores are axially mounted above and below the bottom plate bore. An adjuster device for exerting pressure on the elastomeric spacers is mounted axially below the elastomeric spacer and a bore in a structural member of the aircraft is axially aligned with a through bore in the adjuster device so that a bolt axially aligns all the bores and retains each component in a tight configuration. The back wall is attached to an escutcheon plate which in turn is attached to a lower portion of an aircraft interior panel.

The upper support bracket has a mounting plate riveted to the aircraft fuselage frame structure. A pivot arm is attached but spaced apart at a first end to the mounting plate by an elastomeric spacer. The pivot arm is attached at a second end to a panel bracket attached to an upper portion of the interior panel.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
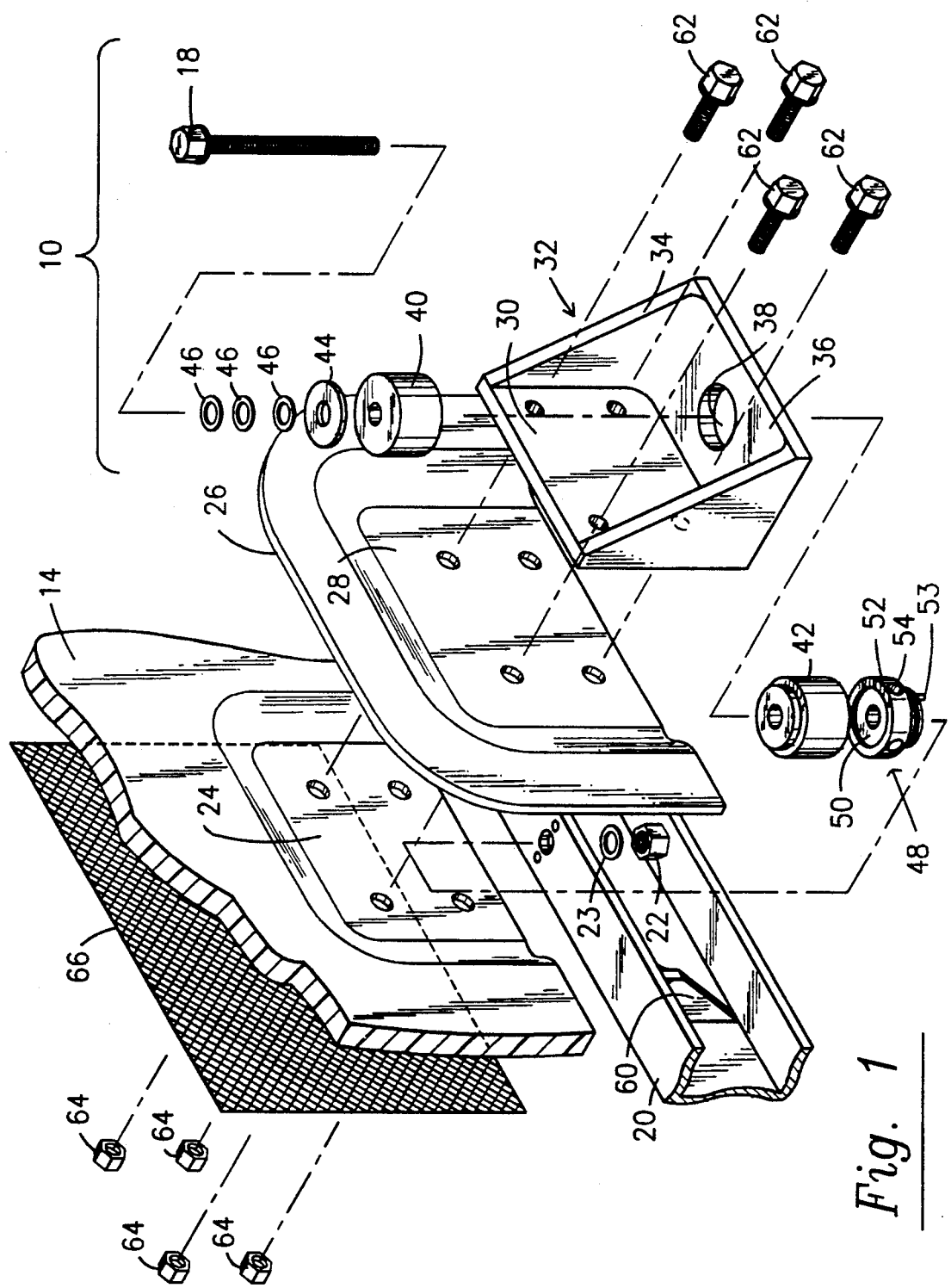
FIG. 1 is an exploded view of a lower dampening bracket attached to an aircraft frame.

Throughout the following detailed description, the same reference numerals refer to the same elements in all figures.

Figure 2:
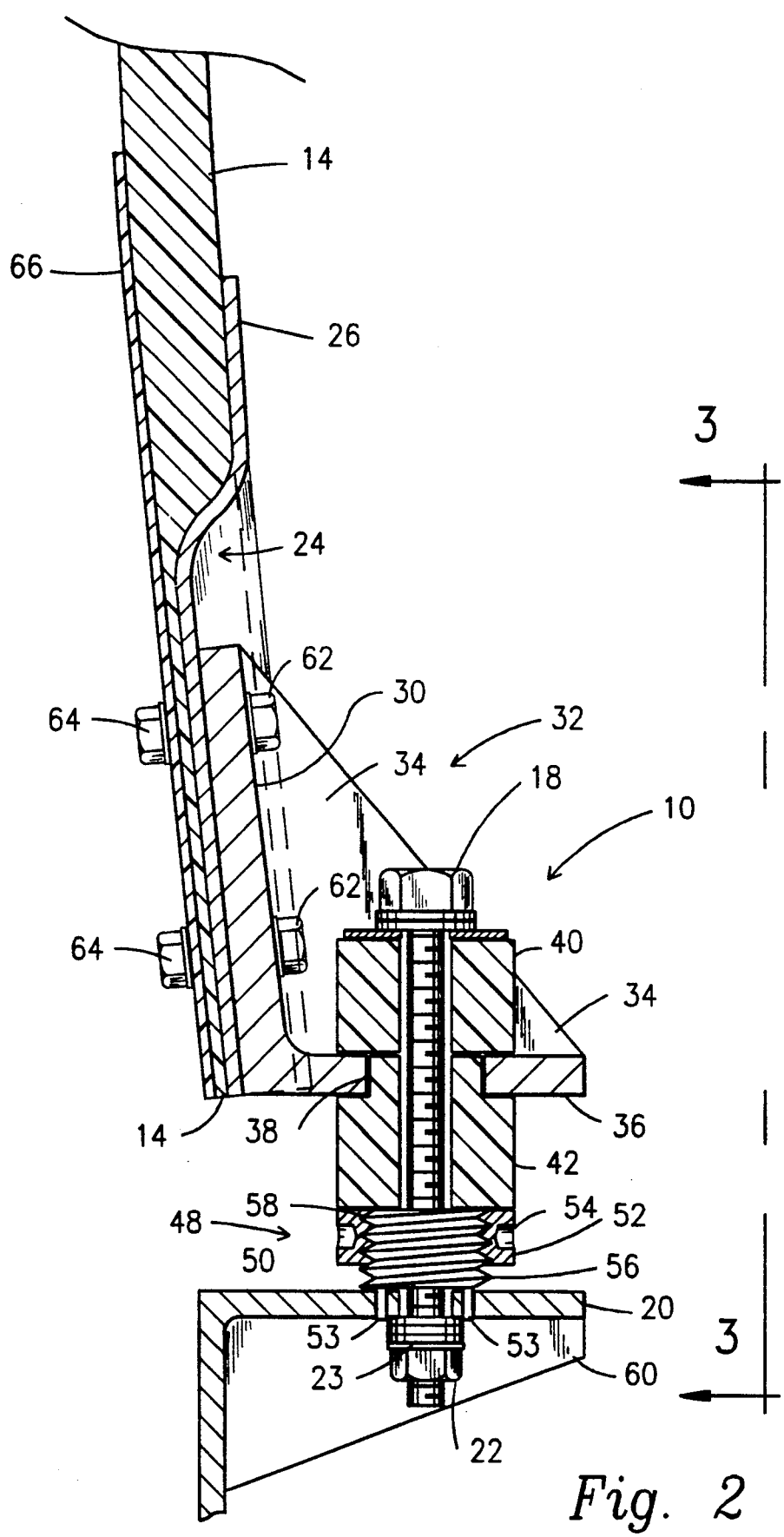
FIG. 2 is a sectional elevational view of the lower dampening bracket attached to an aircraft frame.
Figure 3:
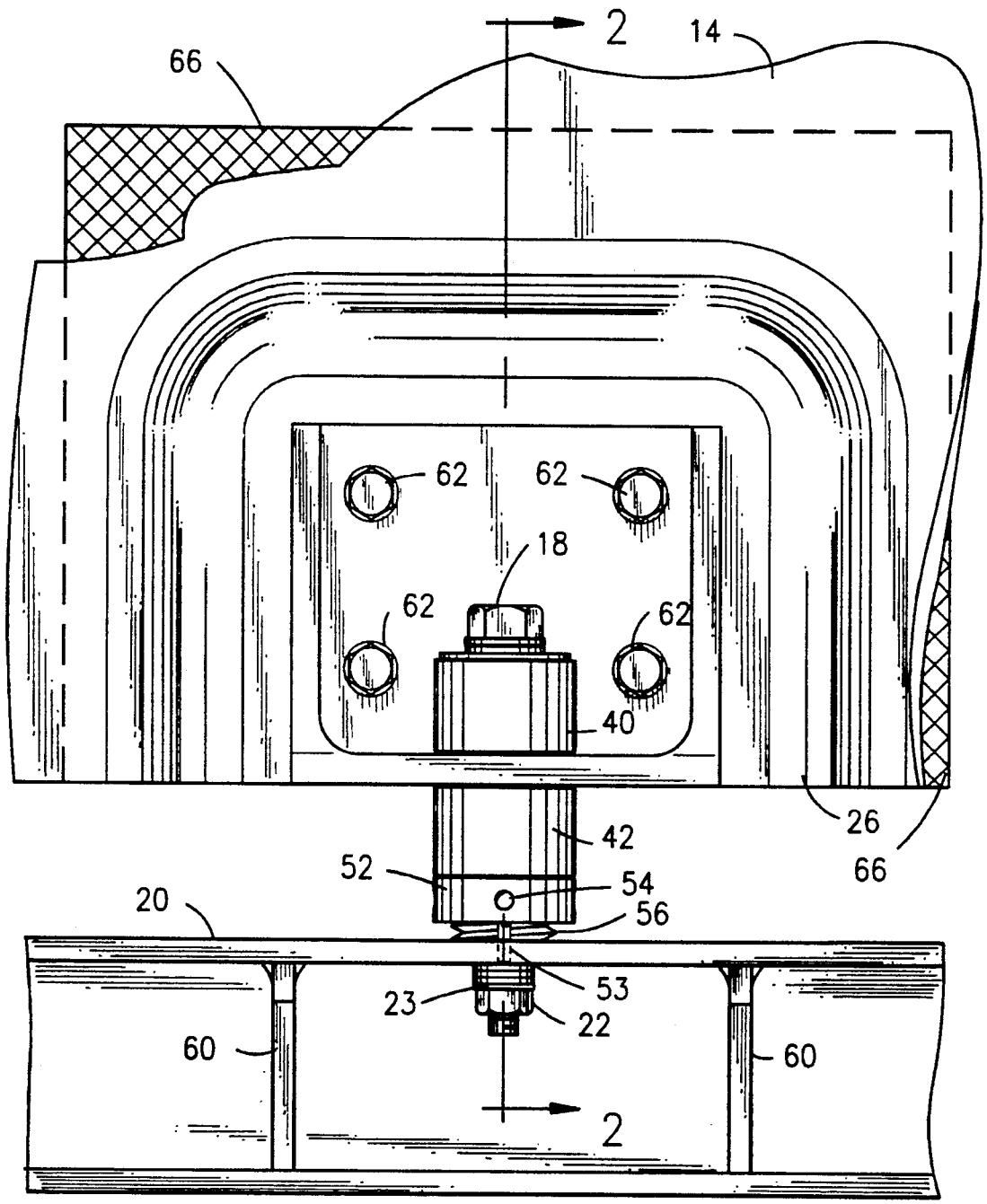
FIG. 3 is a front elevational view of the lower dampening bracket joining an interior panel, partially in section, to the aircraft frame.

The lower bracket 10 and the upper bracket 12 join a panel member 14 and act to space the panel 14 from the aircraft fuselage frame 16. The lower bracket 10, as shown in FIGS. 1, 2 and 3 is bolted by bolt 18 to a channel leg 20 of the fuselage frame. A nut 22 holds the bracket in place.

A cutout portion 24 of panel 14 receives an escutcheon plate 26. The escutcheon plate 26 also has a cutout portion 28 which receives the backside 30 of a mounting bracket 32. The mounting bracket 32 has angled sides 34 and a bottom plate 36 having a bore 38 for receipt of the bolt 18. Elastomeric spacers 40 and 42 respectively, are mounted above and below bore 38. The spacers are preferable made of silicone rubber. A large washer 44 is axially mounted above the upper elastomeric spacer 40 and three smaller washers 46 are axially mounted above the larger washer 44. Below the elastomeric spacer 42, an adjuster device 48 is axially mounted. This adjuster device 48 has an inner cylindrical member 50 which does not move and is surrounded by an outer annular ring 52 which has inner threads 58 engaging outer threads 56 on the inner cylindrical member 50. Once the bolt 18 is in place, the annular ring 52 can be turned on its threads 58 to exert more or less pressure on panel 14. The annular ring 52 has side bores 54 for receiving a turning device. A brace 60 supports the channel leg 20 on which the lower bracket 10 is mounted. Bolts 62 and nuts 64 hold the mounting bracket 10, the escutcheon plate 26 and panel 14 together, along with a reinforcing mesh 66.

As seen in FIG. 2, the lower end of panel 14 is spaced apart from the aircraft fuselage channel leg 20 by the lower bracket 10. Panels 14 are made of a honeycomb material and the washers are made of Delrin ®. The mounting bracket 32 is made from a high strength aluminum. The escutcheon plate 26 is made from woven fiberglass and phenolic resin.

Figure 4:
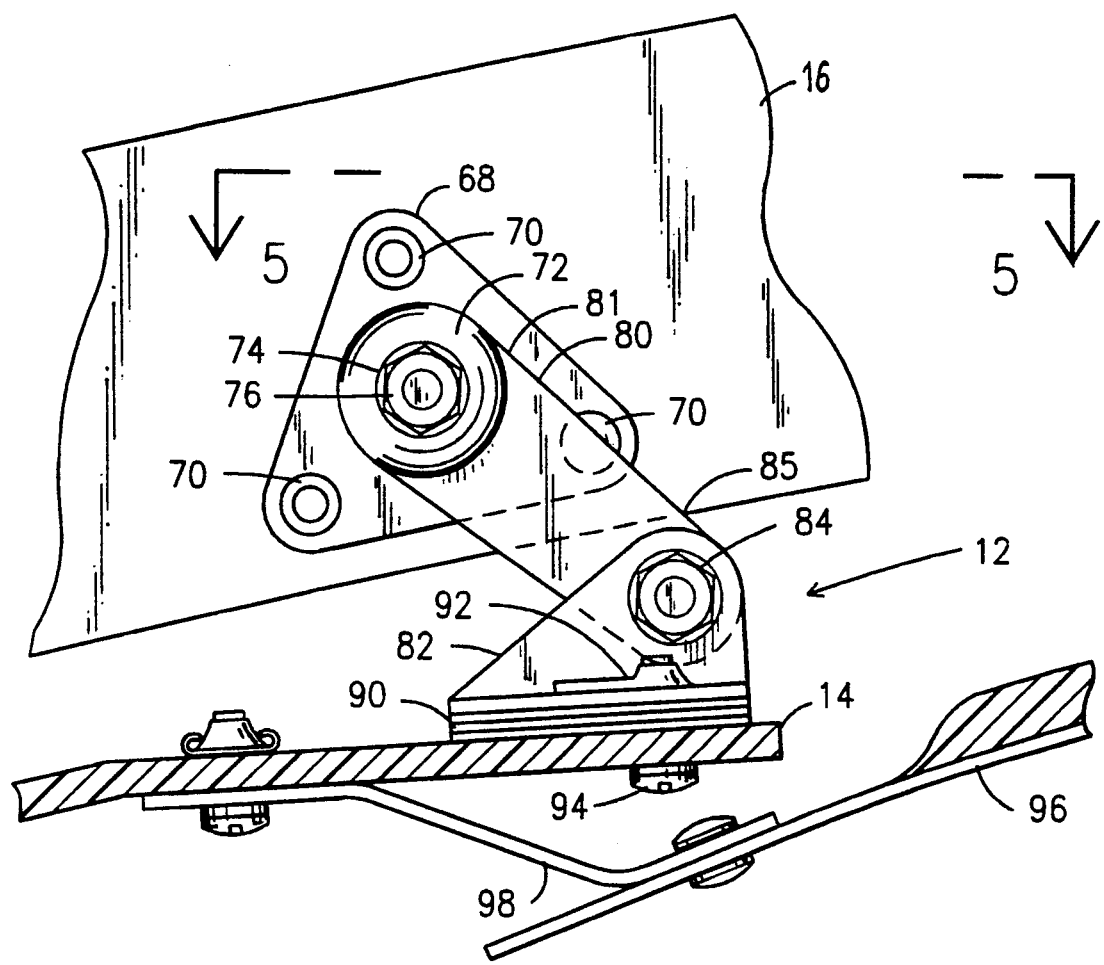
FIG. 4 is a sectional side view of the upper dampening bracket joining an interior panel to the aircraft frame along lines 4—4 of FIG. 5.
Figure 5:
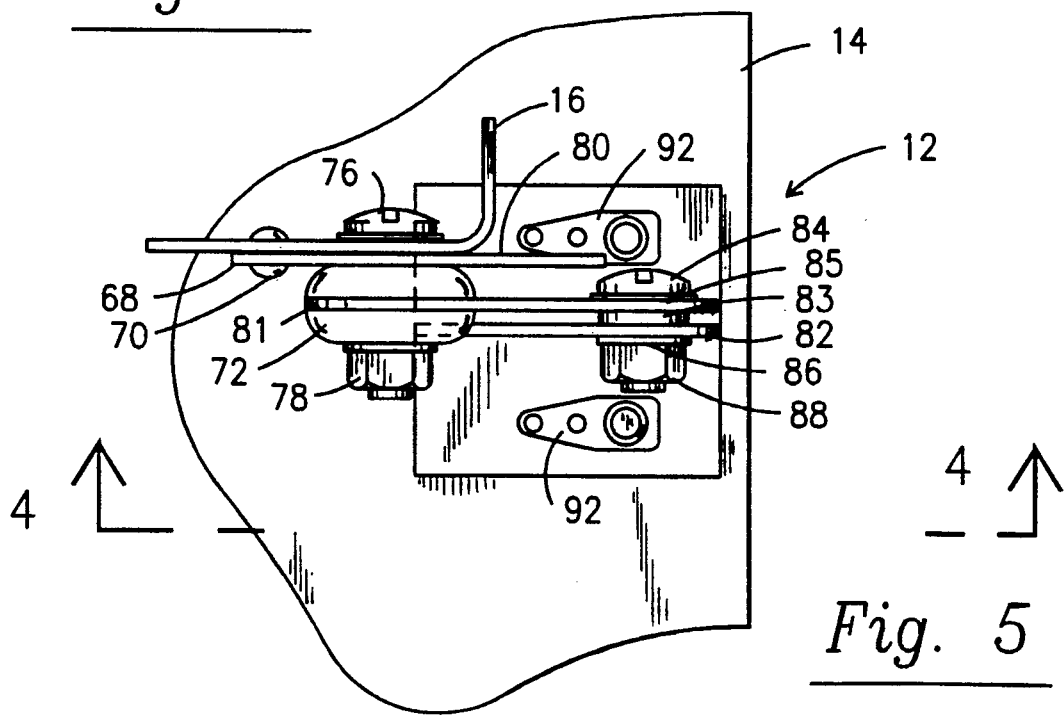
FIG. 5 is a top plan view along lines 5—5 of FIG. 4.

The upper bracket 12, shown in FIGS. 4 and 5, has a mounting plate 68 riveted to frame 16 in at least three places by rivets 70. A one piece elastomeric gasket 72, preferable made of silicone rubber has a bore 74 through which a bolt 76 is inserted and held in place by nut 78. A joining arm 80 having a first end 81, the aircraft frame 16 and frame mounting plate 68 are all axially aligned by bolt 76 which holds all these elements in place. The joining arm 80 attaches at a second end 85 to an upright portion 82 of the bracket 12. A bolt 84 through spacer 83, upright portion 82 and washer 86 is held in place by nut 88. Multiple spacers 90 separate the upright portion 82 of the bracket 12 from panel 14. A nut plate 92 receives a threaded bolt 94 to hold the upright portion 82 of the bracket 12 and the spacers to the panel 14. Adjacent panel 96 can be joined to panel 14 by a simple joining bracket 98, as shown in FIG. 4.

The lower bracket 10 and upper bracket 12 space the panel 14 from the aircraft frame 16 and allow movement of panel 14 in an upper or lower configuration. A tool is placed in the side bore 54 of ring 52 to turn the ring on its threads to raise or lower the panel member 14. The hinge mechanism of upper bracket 12 through movement of arm 80 provides a means for adjusting the height of panel 14 and retains the panel 14 in a spaced relationship to the aircraft frame 16. This results in reduced interior cabin vibration and noise.

Having thus described the invention, what is claimed and desired to be secured by Letters Patent is:

1. A lower and upper noise dampening support bracket for spacing an aircraft interior panel apart from an aircraft fuselage frame structure comprising, the lower noise dampening support bracket having an integral upright back wall, a pair of side walls and a bottom plate with a bore through the bottom plate, an upper elastomeric spacer having a central bore axially mounted above the bottom plate bore and a lower elastomeric spacer having a central bore axially mounted below the bottom plate, an adjuster device having a central bore axially mounted below the lower elastomeric spacer and adjacent a structural member of the aircraft containing a bore, the axial mounting maintained by a holding means through each bore, the back wall of the lower bracket adapted to be attached to a first side of an escutcheon plate, the escutcheon plate adapted to be attached to a lower portion of an aircraft interior panel, the upper noise dampening support bracket having a mounting plate attached to the aircraft fuselage frame structure, a pivoting arm spaced from the mounting plate at a first end by an elastomeric gasket and attached at a second end to an upright portion of a panel bracket, a base portion of the panel bracket attached to an upper portion of the aircraft interior panel so that the interior panel can move without regard to any movement of the aircraft fuselage frame structure.

2. The lower dampening support bracket according to claim 1 wherein the holding means is a bolt through each bore held in place by a nut on a surface of the structural member of the aircraft opposed to a surface of the structure member adjacent the adjuster device.

3. The lower dampening support bracket according to claim 1 wherein the adjuster device has a non-movable donut shaped central member peripherally enclosed by a ring, threads on a peripheral edge of the central member adapted to engage threads on an inner wall of the ring so that the ring can move axially to exert more or less pressure on the elastomeric members.

4. The lower dampening support bracket according to claim 1 wherein the escutcheon plate has an indented first side adapted to receive the back wall and the aircraft interior panel having an indented portion adapted to receive an opposed side of the escutcheon plate with respect to the escutcheon plate first side.

5. The lower dampening support bracket according to claim 4 wherein the lower portion of the interior panel has a reinforcing mesh on an opposed side from the indented portion, the back wall, escutcheon plate, interior panel and reinforcing mesh adapted to be held in place by multiple through bolts.

6. The upper noise dampening support bracket according to claim 1 wherein the mounting plate is riveted to the aircraft fuselage frame structure and the first end of the pivoting arm is held to the elastomeric gasket and mounting plate by a bolt.

* * * * *